(12) United States Patent
Dyer

(10) Patent No.: US 10,865,713 B2
(45) Date of Patent: Dec. 15, 2020

(54) SYSTEMS AND METHODS FOR COOLING ELECTRONIC ENGINE CONTROL DEVICES

(71) Applicant: Hamilton Sundstrand Corporation, Charlotte, NC (US)

(72) Inventor: Gerald P. Dyer, Suffield, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 206 days.

(21) Appl. No.: 16/041,507

(22) Filed: Jul. 20, 2018

(65) Prior Publication Data

US 2020/0025081 A1 Jan. 23, 2020

(51) Int. Cl.
| | | |
|---|---|---|
| *F02C 7/224* | (2006.01) | |
| *F02C 7/16* | (2006.01) | |
| *F02C 7/22* | (2006.01) | |
| *F02C 7/14* | (2006.01) | |
| *F04D 29/58* | (2006.01) | |

(52) U.S. Cl.
CPC .............. *F02C 7/16* (2013.01); *F02C 7/14* (2013.01); *F02C 7/222* (2013.01); *F04D 29/5813* (2013.01); *F04D 29/5826* (2013.01); *F05B 2220/302* (2013.01); *F05B 2260/232* (2013.01); *F05D 2260/205* (2013.01)

(58) Field of Classification Search
CPC ...... F02C 7/224; F02C 7/236; F04D 29/5813; F04D 29/5826
USPC ........................................................ 417/366
See application file for complete search history.

(56) References Cited

U.S. PATENT DOCUMENTS

| | | | | |
|---|---|---|---|---|
| 1,086,755 A | * | 2/1914 | Curtis ................. | F04D 29/5826 415/179 |
| 2,230,183 A | * | 1/1941 | Ford ........................ | F04D 17/18 417/71 |
| 2,970,437 A | * | 2/1961 | Anderson ................ | F02C 7/185 60/785 |
| 3,733,816 A | * | 5/1973 | Nash .......................... | F02C 7/12 60/39.281 |
| 4,020,632 A | * | 5/1977 | Coffinberry ............... | F02C 7/14 60/773 |

(Continued)

FOREIGN PATENT DOCUMENTS

| | | | | |
|---|---|---|---|---|
| GB | 741433 A | * | 12/1955 | .............. F02C 7/224 |
| GB | 742270 A | * | 12/1955 | .............. F02C 7/224 |
| SU | 844797 A1 | * | 7/1981 | ................ F02C 7/14 |

OTHER PUBLICATIONS

Extended European Search Report dated Nov. 27, 2019, issued during the prosecution of corresponding European Patent Application No. EP 19187340.5.

*Primary Examiner* — Gerald L Sung
*Assistant Examiner* — Marc J Amar
(74) *Attorney, Agent, or Firm* — Locke Lord LLP; Joshua L. Jones; Scott D. Wofsy

(57) ABSTRACT

A pump for a fuel system include a housing, a pumping element, and a takeoff. The housing has an inlet, an outlet, and channel connecting the inlet to the outlet. The pumping element is supported within the housing and bounds the channel. The takeoff is connected to the housing and is in fluid communication with the channel at a location downstream of the inlet, and upstream of the outlet, to divert partially pressurized fuel for cooling an electronic device. Fuel systems and methods of cooling electronic devices are also described.

19 Claims, 4 Drawing Sheets

(56) References Cited

U.S. PATENT DOCUMENTS

| | | | | |
|---|---|---|---|---|
| 4,104,873 A * | 8/1978 | Coffinberry | F02C 7/14 | 60/39.08 |
| 4,714,405 A * | 12/1987 | Schaefer | F02C 7/236 | 415/143 |
| 4,978,277 A * | 12/1990 | Moore | F01D 1/14 | 415/55.6 |
| 5,118,258 A * | 6/1992 | Martin | F02C 7/236 | 417/3 |
| 5,599,163 A * | 2/1997 | Heath | F04D 5/002 | 415/55.1 |
| 9,394,832 B2 * | 7/2016 | Aurousseau | F02C 7/236 | |
| 2001/0027641 A1 * | 10/2001 | Clarke | F02C 7/232 | 60/39.094 |
| 2002/0092301 A1 * | 7/2002 | Kobayashi | F02C 7/12 | 60/736 |
| 2004/0042909 A1 * | 3/2004 | Yoshida | B01D 53/26 | 417/243 |
| 2004/0079081 A1 * | 4/2004 | Jevons | F01D 25/12 | 60/734 |
| 2006/0182641 A1 * | 8/2006 | McCarthy | F04D 1/063 | 417/366 |
| 2007/0297894 A1 * | 12/2007 | Dandasi | F04D 17/168 | 415/55.1 |
| 2010/0018182 A1 * | 1/2010 | Bader | F02C 7/236 | 60/39.281 |
| 2010/0218747 A1 * | 9/2010 | Deichmann | F04D 13/0666 | 123/497 |
| 2011/0296846 A1 | 12/2011 | Aurousseau | | |
| 2012/0102969 A1 * | 5/2012 | Wagner | F04D 29/284 | 60/785 |
| 2016/0146108 A1 * | 5/2016 | Yates | F04B 41/06 | 415/124.1 |
| 2019/0153954 A1 * | 5/2019 | Miller | F02C 7/224 | |
| 2019/0203719 A1 * | 7/2019 | Biddick | F01D 25/162 | |

* cited by examiner

SYSTEMS AND METHODS FOR COOLING ELECTRONIC ENGINE CONTROL DEVICES

BACKGROUND OF THE INVENTION

1. Field of the Invention

The present disclosure relates to cooling systems, and more particularly cooling systems for electronic components such as engine controllers for gas turbine engines.

2. Description of Related Art

In a typical control system for a jet engine there is an electronic engine control whose purpose is to electronically control functions on the engine. Examples of functions requiring control on a typical jet engine include fuel metering, actuation control, and sensing various parameters such as temperature and flow. The electronic engine control generally communicates the devices performing these functions during engine operation to control the various functions according to the operating requirements of the engine.

In some jet engines the electronic engine control is mounted in proximity to hot engine structures. Since the temperature at such locations can affect the operation of some electronic engine controls, fuel cooling is sometimes provided in such applications. Fuel cooling allows for maintaining the electronic engine control in an environment sufficiently cool to operate reliably, typically by removing fluid from a location downstream of the fuel system pump and/or from a location between pumps in fuel systems having more than one fuel pump. Once heated the fuel is generally returned to a location downstream of wherein it was diverted.

Such conventional methods and systems have generally been considered satisfactory for their intended purpose. However, there is still a need in the art for improved pumps, fuel systems, and methods of cooling electronic devices in gas turbine engines. The present disclosure provides a solution for this need.

SUMMARY OF THE INVENTION

A pump for a fuel system include a housing, a pumping element, and a takeoff. The housing has an inlet, an outlet, and channel connecting the inlet to the outlet. The pumping element is supported within the housing and bounds the channel. The takeoff is connected to the housing and is in fluid communication with the channel at a location downstream of the inlet, and upstream of the outlet, to divert partially pressurized fuel for cooling an electronic device.

In certain embodiments a source conduit can be connected to provide fuel to the pump. A takeoff conduit can be connected to the pump takeoff to flow diverted fuel to the electronic device. A supply conduit can be connected to the pump outlet to supply pressurized fuel to a gas turbine engine. A return conduit can be connected upstream of the pump inlet to return diverted fuel to the pump.

In accordance with certain embodiments the pump can be a regenerative boost pump. The regenerative boost pump can include a rotary pumping element. The takeoff can be arranged radially outward of the rotary pumping element. The pump can be a centrifugal boost pump. The centrifugal boost pump can include an impeller pumping element. The takeoff can be arranged radially outward of the impeller. The takeoff can include a fitting or a valve.

A fuel system includes a pump as described above. A source conduit is connected to the pump inlet to provide fuel to the pump and a takeoff conduit is connected to the pump takeoff to flow diverted fuel to the electronic device. A supply conduit is connected to the pump outlet to supply pressurized fuel to a gas turbine engine and a return conduit is connected upstream of the pump inlet to return diverted fuel to the pump.

In certain embodiments the fuel system can include a heat exchanger. The heat exchanger can be in fluid communication with the pump. The heat exchanger can connect the takeoff conduit to the return conduit. An electronic device can be connected to the heat exchanger. The electronic device can be and in thermal communication with fuel flowing through the takeoff conduit and the return conduit. An electronic engine controller (EEC) can be connected to the heat exchanger. The EEC can be in thermal communication with fuel flowing through the takeoff conduit and the return conduit. A gas turbine engine can be connected to the pump outlet by the supply conduit.

In accordance with certain embodiments a heat exchanger can be connected to the fuel pump by the supply conduit. A fuel control module can be connected to the fuel pump by the supply conduit. The pump can be a first stage pump and a second stage pump can be connected to the first stage pump by the supply conduit. A heat exchanger can be connected to the first stage pump by the supply conduit. The heat exchanger be arranged upstream of the second stage pump. A fuel source can be connected to the pump by the source conduit.

A method of cooling an electronic device includes receiving low pressure fuel at the inlet of a fuel pump as described above. The fuel is partially pressurized with the pumping element of the pump. A first portion of the partially pressurized fuel is diverted to cool an electronic device. A second portion of the partially pressurized fuel is further pressurized by the pumping element and discharged through the outlet of the pump to provide fuel to a gas turbine engine.

In certain embodiments the method can include flowing the diverted fuel through an electronic device. The diverted fuel can be returned to the fuel pump inlet. A portion of the diverted fuel can be flowed to and cooled in a heat exchanger downstream of the pump outlet.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
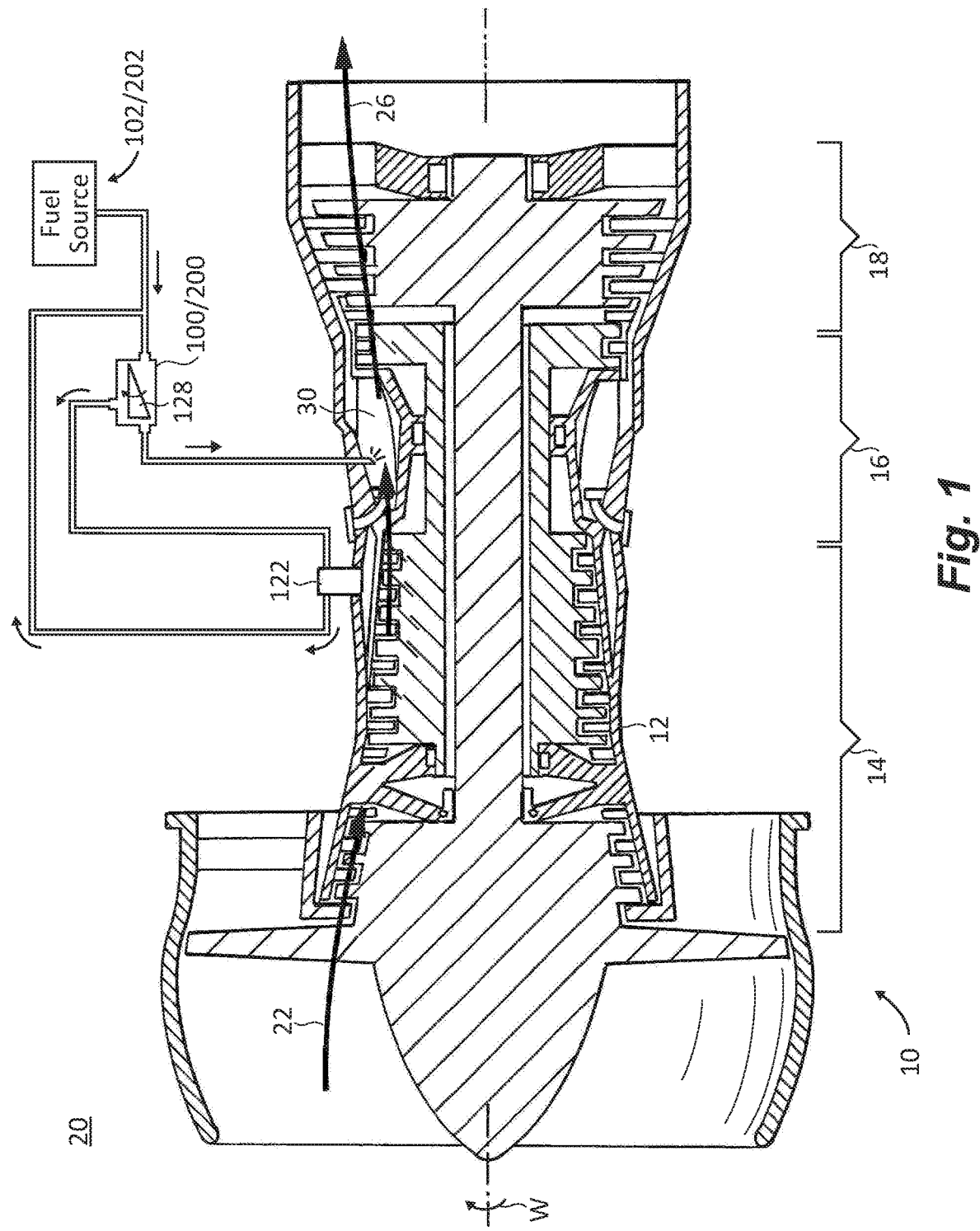
FIG. 1 is a schematic view of an exemplary embodiment of a gas turbine engine constructed in accordance with the present disclosure, showing a fuel system having a pump with a takeoff located between an inlet and an outlet of the pump.

Reference will now be made to the drawings wherein like reference numerals identify similar structural features or aspects of the subject disclosure. For purposes of explanation and illustration, and not limitation, a partial view of an exemplary embodiment of pump in accordance with the disclosure is shown in FIG. 1 and is designated generally by reference character 100. Other embodiments of pumps, fuel systems, and methods of cooling electronic devices in accordance with the disclosure, or aspects thereof, are provided in FIGS. 2-4, as will be described. The systems and methods described herein can be used for cooling electronic devices, such as electronic engine controllers in gas turbine engines, though the present disclosure is not limited to gas turbine engines or to electronic devices in general.

Referring to FIG. 1, a gas turbine engine 10 with an electronic device 122 connected to gas turbine engine 10. Gas turbine engine 10 includes case 12 containing a compressor section 14, a combustion section 16, and a turbine section 18. Compressor section 14 is disposed in fluid communication with external environment 20 and is arranged to compress ambient fluid 22 ingested from external environment 20. Once compressed, fluid 22 is communicated to combustion section 16 as a compressed fluid 24.

Combustion section 16 is disposed in fluid communication with compressor section 14 and is arranged to receive therefrom compressed fluid 24. Using compressed fluid 24 and a flow of fuel $F_2$ received from a boost pump, e.g., centrifugal boost pump 100 (shown in FIG. 1) or regenerative boost pump 200 (shown in FIG. 2), combustion section 16 generates a flow of high pressure combustion products 26, which combustion section 16 communicates to turbine section 18. More particularly, high pressure combustion products 26 are generated by introducing fuel $F_2$ into one or more combustors 30 located in combustion section 16 from fuel system 102 or fuel system 202.

Turbine section 18 is disposed in fluid communication with combustion section 16 and is arranged to receive therefrom high pressure combustion products 26. Turbine section 18 expands the high pressure combustion products 26 as they traverse turbine section 18, extracting work from the expanding high pressure combustion products 26. A portion of the extracted work W is provided to compressor section 14 for powering compressor section 14. As shown in FIG. 1 gas turbine 10 is a gas turbine engine for an aircraft, such as a main engine or an auxiliary power unit. As will be appreciated by those of skill in the art in view of the present disclosure other types of gas turbine engines can also benefit from the present disclosure.

Electronic device 122 is thermally coupled to gas turbine engine 10. To control temperature of electronic device 122 a portion of fuel flowing to combustors 30 is diverted for circulation to electronic device 122. The diverted fuel is diverted from a takeoff located on a housing of the fuel pump, the takeoff located fluidly between an inlet and an outlet of the fuel pump coupled by a channel bounded by a pumping element. The takeoff is connected to the housing and is in fluid communication with the channel at a location downstream of the inlet and upstream of the outlet to divert partially pressurized fuel for cooling electronic device 122.

Figure 2:
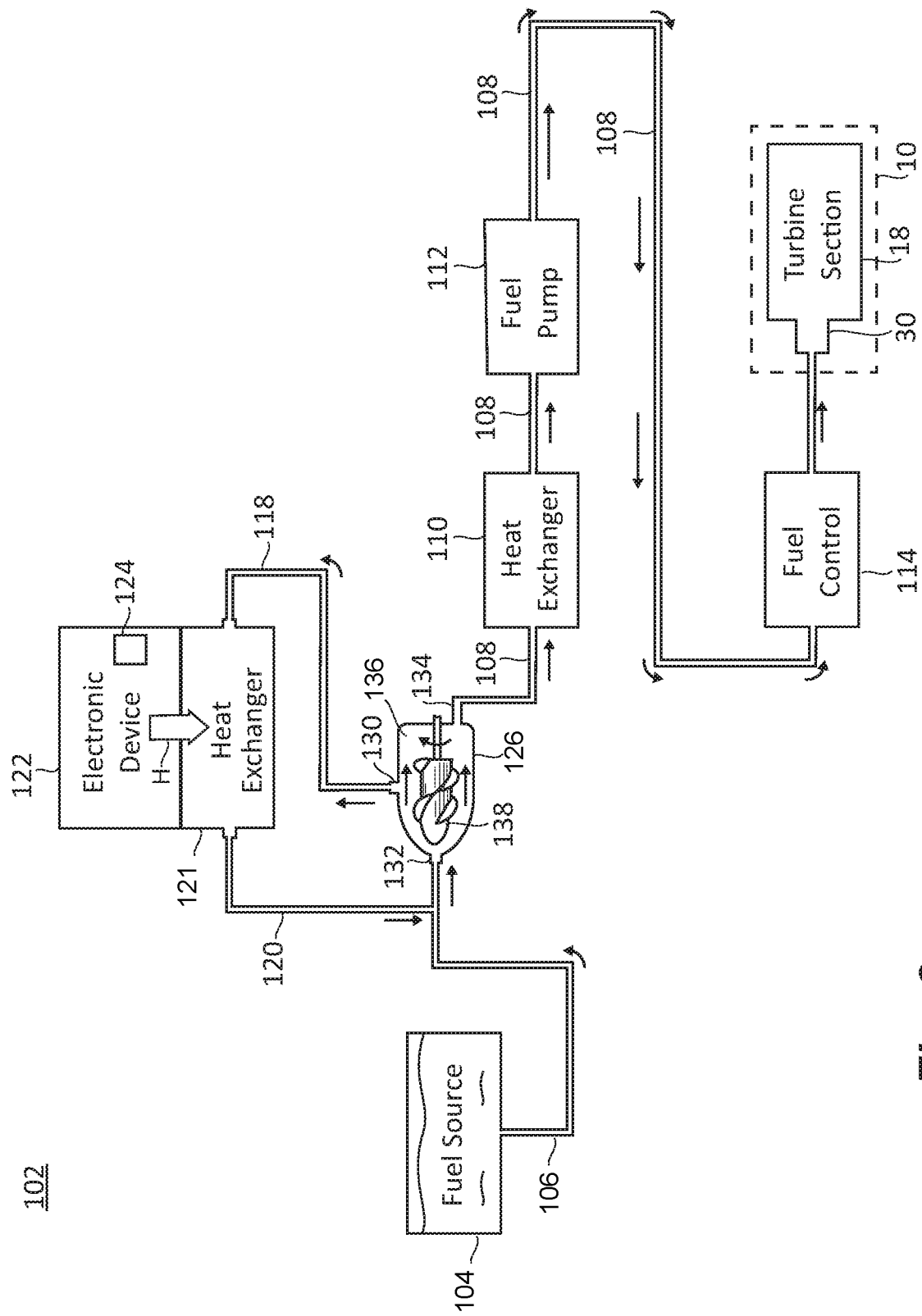
FIG. 2 is a schematic view of the fuel system of FIG. 1 according to a first exemplary embodiment, showing a centrifugal boost pump having a takeoff located between an inlet and an outlet of the centrifugal boost pump.

With reference to FIG. 2, fuel system 102 is shown. Fuel system 102 is configured to provide flow of pressurized fuel $F_2$ to combustors 30 of gas turbine engine. In this respect fuel system 102 includes a fuel source 104, a source conduit 106, and pump 100. Fuel source 104 and source conduit 106 are arranged in series with one another upstream of pump 100 relative to a direction of fuel flow through fuel system 102.

Fuel source 104 includes a supply of fuel F and can be, for example, a fuel tank located on an aircraft. Source conduit 106 connects fuel source 104 with pump 100 such that fuel source 104 is in fluid communication with pump 100 through source conduit 106. As will be appreciated by those of skill in the art in view of the present disclosure, this allows a flow of fuel F to be provided to pump 100 at relatively low temperature and low pressure.

Fuel system 102 also includes a supply conduit 108, a heat exchanger 110, a pump 112, and a fuel control module 114. Supply conduit 108, heat exchanger 110, pump 112, and fuel control module 114 are arranged in series with one another downstream of pump 100 for receiving pressurized fuel $F_2$ from pump 100.

Supply conduit 108 connects heat exchanger 110 to pump 100 and receives therefrom pressurized fuel $F_2$ from pump 100. In the illustrated exemplary fuel system 102 pump 100 is a multistage fuel system with a first stage fuel pump centrifugal boost pump 100, and a second stage pump 112 connected to first stage centrifugal boost pump 100 by heat exchanger 110. As will be appreciated by those of skill in the art in view of the present disclosure, heat exchanger 110 allows for removing or adding heat to fuel $F_2$ as fuel flows through supply conduit 108 between pump 100 and pump 112, as suitable for the intended application.

A cooling circuit 116 with a takeoff conduit 118, a return conduit 120, and a heat exchanger 121 is connected in parallel with portions of fuel system 102 extending through source conduit 106 and pump 100 for removing heat from an electronic device 122. Takeoff conduit 118 is connected to pump 100 and receives therefrom a portion of fuel $F_1$ provided to pump 100 by source conduit 106. Heat exchanger 121 is connected to pump 100 by takeoff conduit 118 to receive therefrom the portion of fuel $F_1$ taken off by takeoff conduit 118. It is contemplated that electronic device 122 in thermal communication with heat exchanger 121, e.g., by direct mechanical connection, for communicating heat from electronic device 122 to fuel $F_1$. Heat exchanger 121 is in turn connected to source conduit 106 by return conduit 120, which returns the portion of fuel $F_1$ taken off from pump 100 at a location upstream of pump 100, e.g., to source conduit 106, where it intermixes with fuel $F_2$ from fuel source 104.

In certain embodiment electronic device 122 includes an engine electronic controller (EEC) 124. As will be appreciated by those of skill in the art in view of the present disclosure, cooling circuit 116 can provide localized cooling to EEC 124, enabling EEC 124 to be packaged within gas turbine engine 10 (shown in FIG. 1) in proximity to hot engine components, reducing the size and weight of the provisioning otherwise required for EEC 124. This can be advantageous applications requiring where space is limited, such as in turboshaft engines for rotorcraft like the T900 family of turboshaft engines, available from the Advanced Engine Technology Company of Huntsville, Ala.

Pump 100 include a housing 126, a pumping element 128, and a takeoff 130. Housing 126 has an inlet 132, an outlet 134, and channel 136 connecting inlet 132 to outlet 134. Pumping element 128 is supported within housing 126 and bounds at least a portion of channel 136. Takeoff 130 is connected to housing 126 and is in fluid communication with channel 136 at a location downstream (relative to the direction of the flow of fuel $F_2$ through pump 100) of inlet 132, and upstream of outlet 134, to divert partially pressurized fuel $F_1$ for cooling electronic device 122.

In certain embodiments takeoff 130 includes an aperture defined in housing 126. In this respect the aperture can extend through a thickness of housing wall between inner and outer surfaces of housing 126. The location can be adjacent to a location where fuel traversing pump 100 is sufficiently cool and pressurized to cool electronic device 122 using a relatively small flow rate. In accordance with certain embodiments takeoff 130 can include a fitting, a tap, or a valve seated within the wall of housing 126.

As shown in FIG. 2, fuel system 102 includes a centrifugal boost pump 100. In this respect pumping element 128 includes a rotary pumping element 138 supported for rotation in housing 126. It is contemplated that rotary pumping element 138 be supported for rotation within housing 126, bounds at least a portion of channel 136, and by arranged radially inward of takeoff 130 to progressively increase pressure of fuel $F_{1/2}$ as fuel $F_{1/2}$ traverses channel 136 between inlet 132 and outlet 134. Location of takeoff 130 on housing 126 is according to the temperature, pressure, and/or flow rate requirements of the specific application.

Figure 3:
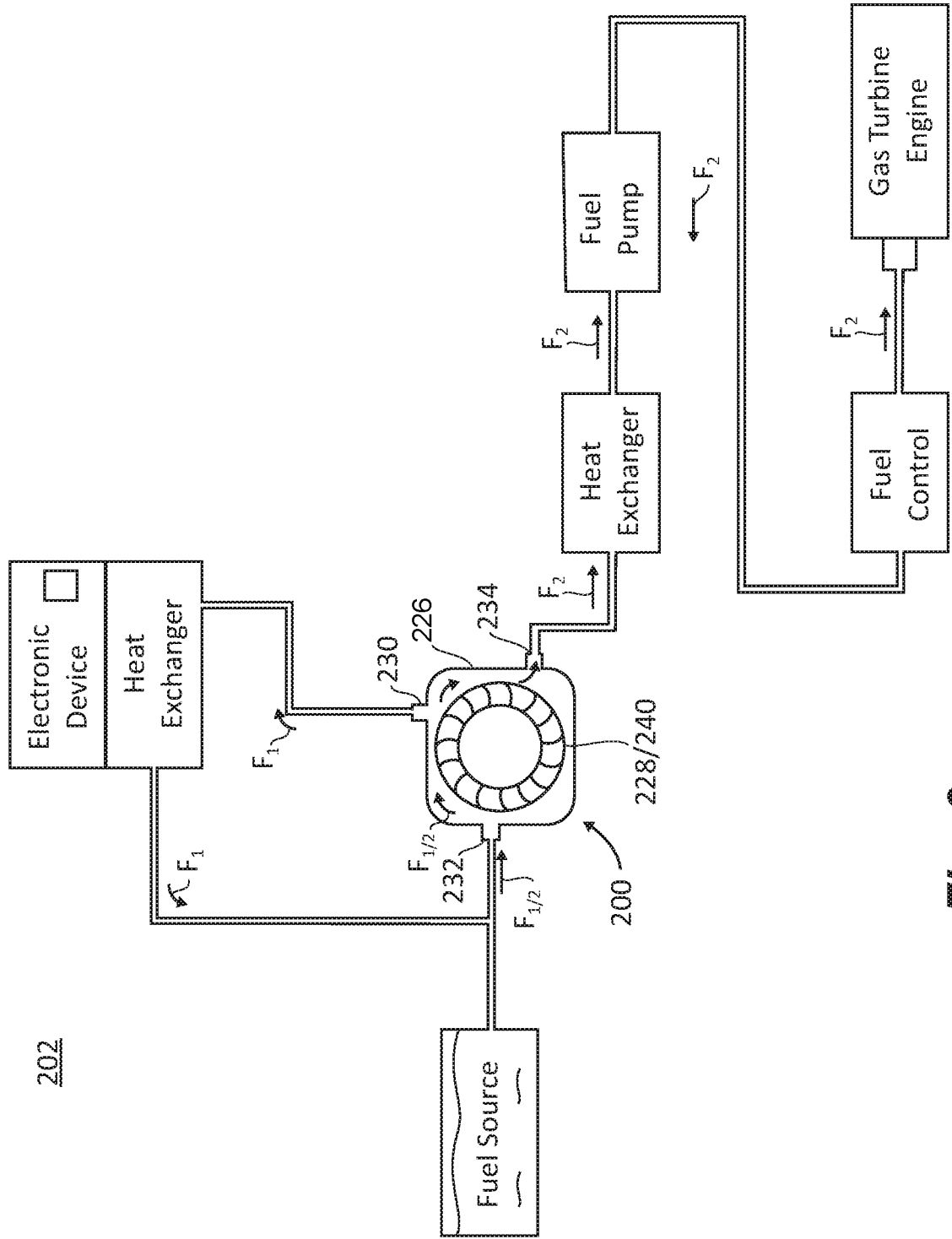
FIG. 3 is a schematic view of the fuel system of FIG. 1 according to a second exemplary embodiment, showing a regenerative boost pump having a takeoff located between an inlet and an outlet of the regenerative boost pump.

With reference to FIG. 3, a fuel system 202 is shown. Fuel system 202 is similar to fuel system 102 (shown in FIG. 1) and additionally includes a regenerative boost pump 200. Regenerative boost pump 200 includes a pumping element 228 having an impeller 240. Takeoff 230 is located on housing 226, is arranged radially outward of impeller 240, and is fluidly downstream of inlet 232 and upstream of outlet 234. As above, takeoff 230 can include an aperture defined in housing 226 with a fitting, tap, and/or valve seated within the aperture. Further, the location of takeoff 230 on housing 226 along the direction of fuel flow along impeller 240 can similarly be selected according to the temperature, pressure, and/or flow rate requirements of cooling required for the specific application.

Figure 4:
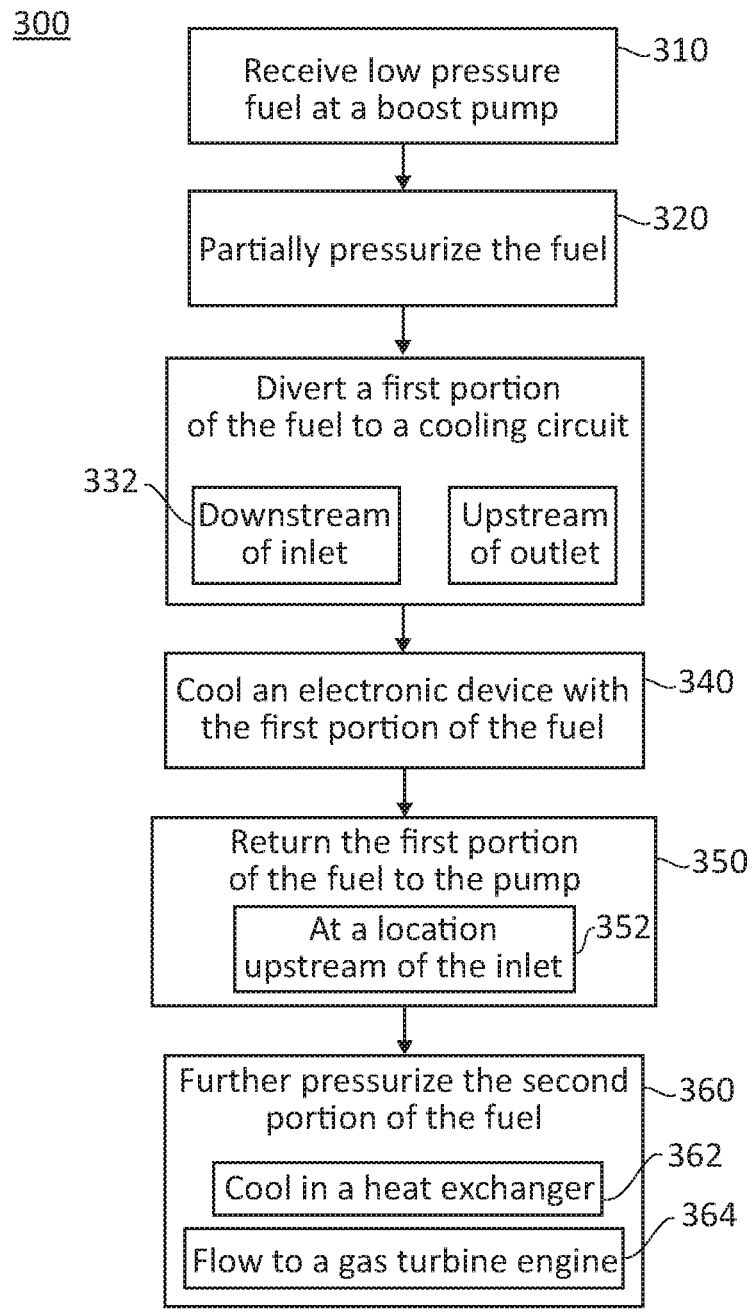
FIG. 4 is a block diagram of a method of cooling an electronic device, showing operations of the method according to an exemplary embodiment.

With reference to FIG. 4, a method 300 of cooling an electronic device, e.g., electronic device 122 (shown in FIG. 2), is shown. Method 300 includes receiving low pressure fuel, e.g., low pressure fuel $F_{1/2}$ (shown in FIG. 2), as shown with box 310. It is contemplated that the temperature be received at the inlet of a fuel pump, e.g., inlet 132 (shown in FIG. 2) of centrifugal boost pump 100 (shown in FIG. 2). As will be appreciated by those of skill in the art in view of the present disclosure, fuel received at the inlet of the fuel pump, e.g., at the inlet of the first stage fuel pump, is typically relatively cool. Therefore, for purposes of limiting (or minimizing) the amount of fuel necessary to for cooling purposes, it can be desirable to divert fuel as close to the inlet as possible. However, as it is also necessary that the diverted fuel have pressure sufficient to overcome the resistance presented by the cooled component, e.g., heat exchanger 110, it can be desirable to increase the pressure of the fuel by removing the fuel downstream of the pump inlet.

To accomplish these goals the fuel is partially pressurized with the pumping element of the pump, e.g., via rotation of pumping element 128 (shown in FIG. 2), as shown with box 320. A first portion of the partially pressurized fuel is then diverted to cool the electronic device, as shown with box 330. The partially pressurized fuel is removed from the pump downstream of the pump inlet and upstream of the pump outlet, e.g., upstream of outlet 134 (shown in FIG. 4), as shown with boxes 332 and 334. This allows for selecting a suitable combination of temperature (which typically increases during pumping) and pressure without being constrained by a fixed increase in both temperature and pressure otherwise dictated by the pump when fuel is diverted downstream of the pump outlet.

The diverted fuel is routed to a heat exchanger and heat transferred into the fluid from the environment of an electronic device, e.g., electronic device 122, as shown with box 340. Once heated, the fuel is returned to the fuel system, as shown with box 350. As shown with box 352, it is contemplated that the heated fuel be returned to a location upstream of the inlet of the pump, e.g., to a union of return conduit 120 and source conduit 106. While returning the fuel to the fuel system at a location upstream of the pump inlet increases the temperature of fuel at the pump inlet, which ordinarily is a detriment to cooling circuit efficiency, applicants have determined that doing so can be advantageous in comparison to alternatives, such as turboshaft engines for rotorcraft, which typically do not operate at extreme altitudes.

As shown with box 360, a second portion of the partially pressurized fuel is further pressurized by the pumping element and discharged through the outlet of the pump, e.g., outlet 134 (shown in FIG. 2). The second portion flows to a combustor of gas turbine engine, to provide a flow of fuel to a gas turbine engine, e.g., gas turbine engine 10 (shown in FIG. 1), as shown with box 364. The second portion of the fuel can be cooled in a heat exchanger located downstream of the outlet, e.g., in heat exchanger 110 (shown in FIG. 2), as shown with box 362.

Electronic devices can be employed on gas turbine engines, such as turboshaft engines for rotorcraft, to control engine functions like fuel metering, actuation, and sensing. In some gas turbine engines it can be desirable to cool the electronic device, such as when the electronic device is located in proximity to a hot engine component and/or is located outside of environmentally controlled space. In such applications the heating or cooling of such electronic controllers can be accomplished by providing a flow of fuel to the electronic device. The efficiency of such cooling is generally influenced by the pressure and temperature of the fuel downstream of the pump, flow rate typically being selected to balance each with the heat transfer requirement(s) of the electronic device.

In embodiments described herein pumps are provided with a takeoff located between the pump inlet and the pump outlet. The takeoff allows for diversion of fuel at temperatures and pressures below that typically available at the pump outlet. This allows for selection of a mass flow rate, for the given heat transfer requirement, that is lower than that otherwise necessary when fuel is diverted from downstream of the pump outlet, potentially improving the efficiency of the cooling circuit used to provide cooling/heating to the electronic device in thermal communication with the fuel circuit through the cooling circuit. In certain embodiments described herein the cooling circuit returns heated fluid to the fuel system upstream of the pump inlet, further reducing the efficiency debit generally associated with the fuel system cooling circuit. By pulling the cooling flow at a point in the pump that is at a lower pressure than the outlet pressure of the pump the fuel pressure and temperature rise in the fluid diverted for cooling is limited (or minimized), relative to pressure and temperature of the pump.

The methods and systems of the present disclosure, as described above and shown in the drawings, provide for pumps, fuel systems, and method of cooling electronic devices in gas turbine engines with superior properties including improved efficiency. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A pump, comprising:
   a housing with an inlet, an outlet, and channel connecting the inlet to the outlet;
   a pumping element comprising an impeller supported within the housing and bounding the channel; and
   a takeoff connected to the housing, wherein the takeoff is in fluid communication with the channel at a location downstream of the inlet and upstream of the outlet to divert partially pressurized fuel for cooling an electronic device, wherein the takeoff is located at a position in the housing axially between a leading edge and a trailing edge of the impeller.

2. The pump as recited in claim 1, further comprising a source conduit connected to the pump inlet to provide fuel to the pump.

3. The pump as recited in claim 1, further comprising a takeoff conduit connected to the pump takeoff to flow diverted fuel to a heat exchanger.

4. The pump as recited in claim 1, further comprising a supply conduit connected to the pump outlet to supply pressurized fuel to a gas turbine engine.

5. The pump as recited in claim 1, further comprising a return conduit connected upstream of the pump inlet to return diverted fuel to the pump.

6. The pump as recited in claim 1, wherein the pump is a centrifugal boost pump, the takeoff arranged radially outward of the impeller.

7. A fuel system, comprising:
   a pump as recited in claim 1;
   a source conduit connected to the pump inlet to provide fuel to the pump;
   a takeoff conduit connected to the pump takeoff to flow diverted fuel to a heat exchanger;
   a supply conduit connected to the pump outlet to supply pressurized fuel to a gas turbine engine; and
   a return conduit connected upstream of the pump inlet to return diverted fuel to the pump.

8. The fuel system as recited in claim 7, further comprising the heat exchanger connecting the takeoff conduit to the return conduit.

9. The fuel system as recited in claim 8, wherein the electronic device is connected to the heat exchanger and in thermal communication with fuel flowing through the takeoff conduit and the return conduit.

10. The fuel system as recited in claim 8, wherein the electronic device includes an electronic engine controller connected to the heat exchanger and in thermal communication with fuel flowing through the takeoff conduit and the return conduit.

11. The fuel system as recited in claim 7, further comprising the heat exchanger being connected to the fuel pump by the supply conduit.

12. The fuel system as recited in claim 7, further comprising a fuel control module connected to the fuel pump by the supply conduit.

13. The fuel system as recited in claim 7, wherein the pump is a first stage pump, and further a second stage pump connected to the first stage pump by the supply conduit.

14. The fuel system as recited in claim 13, further comprising the heat exchanger being connected to the first stage pump by the supply conduit and arranged upstream of the second stage pump.

15. The fuel system as recited in claim 7, further comprising a fuel source connected to the pump by the source conduit.

16. A pump, comprising:
   a housing with an inlet, an outlet, and channel connecting the inlet to the outlet;
   a pumping element comprising a single impeller supported within the housing and bounding the channel; and
   a takeoff connected to the housing, wherein the takeoff is in fluid communication with the channel at a location downstream of the inlet and upstream of the outlet to divert partially pressurized fuel for cooling an electronic device, wherein the pump is a regenerative boost pump with the pumping element being a rotary pumping element, the takeoff arranged radially outward of the single impeller of the rotary pumping element, between an inlet end extent of the single impeller and an outlet end extent of the single impeller.

17. A method of cooling, comprising:
   at a fuel pump for a fuel system including a housing with a channel connecting an inlet to an outlet, a pumping element supported within the housing and bounding the channel, and a takeoff connected to the housing, the takeoff is in fluid communication with the channel at a location downstream of the inlet and upstream of the outlet;
   receiving low pressure fuel at the inlet;
   partially pressurizing the fuel with the pumping element;
   diverting a first portion of the partially pressurized fuel to cool an electronic device;
   further pressurizing a second portion of the partially pressurized fuel; and
   discharging the further pressurized fuel through the outlet to provide fuel to a gas turbine engine, and returning the diverted fuel to the inlet of the fuel pump at a location downstream of a fuel tank.

18. The method as recited in claim 17, further comprising flowing the diverted fuel through a heat exchanger.

19. A pump for a fuel system, comprising:
   a housing with an inlet, an outlet, and channel connecting the inlet to the outlet;
   a pumping element comprising an impeller supported within the housing and bounding the channel; and
   a takeoff connected to the housing, wherein the takeoff is in fluid communication with the channel at a location downstream of the inlet and upstream of the outlet to divert partially pressurized fuel for cooling an electronic device, wherein the takeoff is located on the housing at a position in the housing radially outward of the pumping element between a leading edge and a trailing edge of the impeller.

* * * * *